Oct. 25, 1938.   W. W. DENTON   2,134,327
SAP COLLECTING GUTTER
Filed Dec. 15, 1937
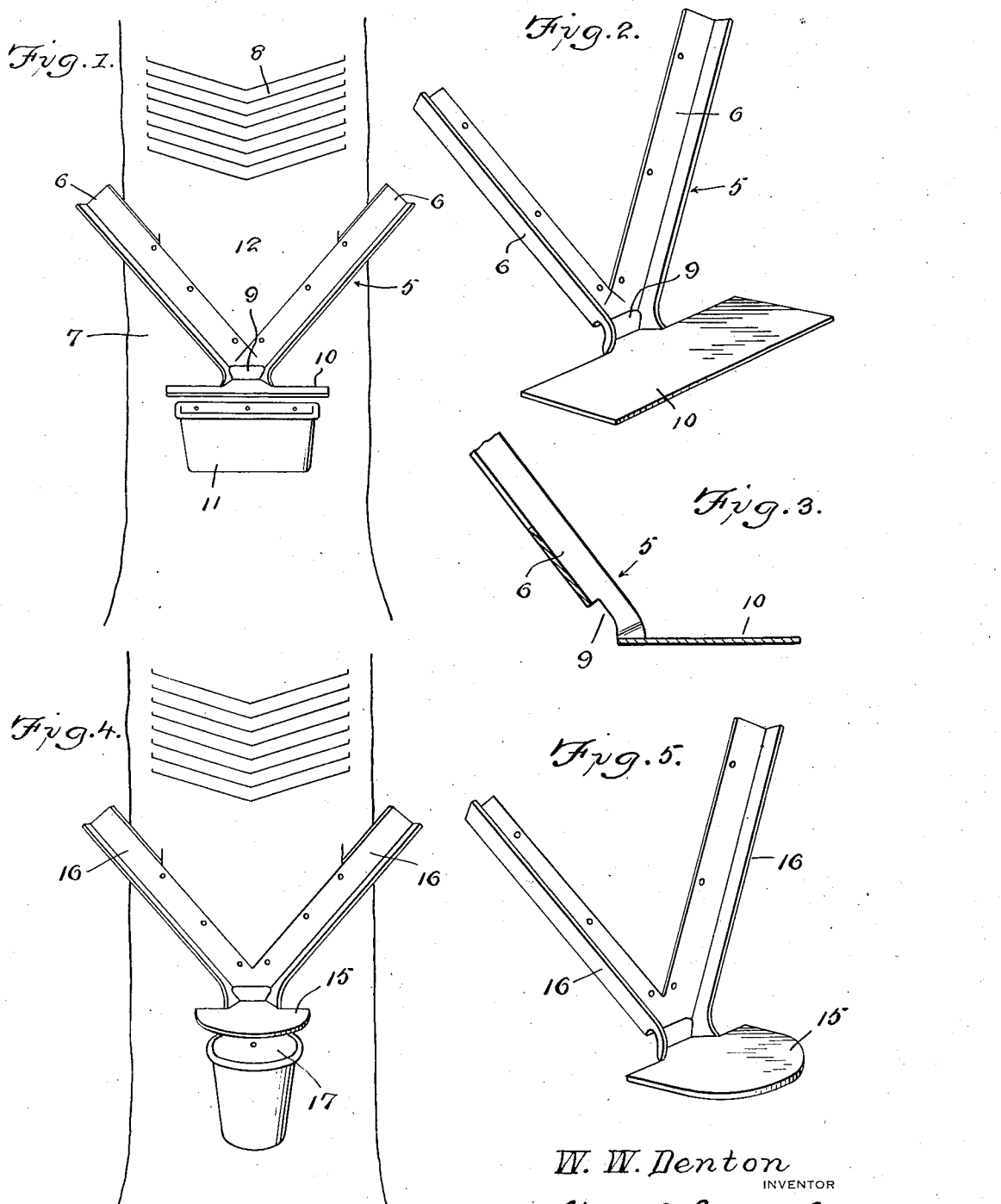
W. W. Denton
INVENTOR
BY Victor J. Evans & Co.
ATTORNEYS Patented Oct. 25, 1938

2,134,327

UNITED STATES PATENT OFFICE 2,134,327

SAP COLLECTING GUTTER

William W. Denton, Russell, Fla.

Application December 15, 1937, Serial No. 179,993

2 Claims. (Cl. 47—11)

My invention relates to an improved form of means used in connection with collecting saps, gums and the like from trees and which I term a sap-collecting gutter.

One of the principal objects of my invention is to provide a sap-collecting gutter adapted to be attached to the trunk of a tree subjacent the sap-emitting kerfs whereby the sap is directed into a receptacle.

Another object of my invention is to provide a device of the above described character fashioned with means for preventing foreign matter from entering the sap-collecting receptacle.

A further object of my invention is to provide a device of the above described character adapted to be attached to the trunk of a tree subjacent the sap-emitting kerfs in a manner whereby to form an apron of an area of the trunk subjacent the kerfs over which the sap will flow onto the device and be directed into a receptacle.

A still further object of my invention is to provide a sap-collecting gutter which is simple in construction, efficient in use and easy of attachment to the trunks of trees.

Other objects and advantages will be apparent from the following description, appended claims and annexed drawing.

Referring to the drawing wherein like reference characters designate like parts throughout the several views:

Fig. 1 is a front elevation of my invention illustrating the same attached to a trunk of a tree.

Fig. 2 is a perspective view thereof.

Fig. 3 is a detail vertical sectional view.

Fig. 4 is a front elevation of a modified from illustrating the same attached to the trunk of a tree.

Fig. 5 is a perspective view of the modified form.

In practicing my invention, in the preferred embodiment illustrated in Figures 1 to 3 inclusive, I provide a gutter 5 fashioned with a pair of upwardly and outwardly diverging sections or members 6 having right angularly disposed sides. Said sections are secured, by means of nails or the like, to a trunk 7 of a tree having sap-emitting kerfs 8 formed therein. The sections 6 are connected together at their lower ends and are formed with a discharge port 9 at the jointure thereof, said sections terminating at said jointure in an outwardly extending rectangular-shaped guard 10 which functions to prevent the entrance of foreign matter, such as chips or the like, from entering a rectangular-shaped sap-collecting receptacle 11 secured to the trunk of the tree subjacent the port 9.

The gutter is secured to the trunk of a tree subjacent the kerfs 8 and the diverging sections to form an apron 12 on said trunk of the area between said sections and in the crotch thereof whereby sap, emitted from said kerfs and flowing over said apron, will be received in said sections and discharged through the port 9 into the receptacle 11.

From the foregoing it will be apparent that the gutter may be easily attached to and removed from the trunks of trees and used in connection with trees of various sizes.

In the modification illustrated in Figures 4 and 5, the guard 15 formed on the sections 16 is of a substantially semi-circular configuration for use in connection with sap-collecting receptacles having a cylindrical-shaped mouth 17.

While the construction of the gutter herein described and illustrated in the drawing is formed from a one piece sheet metal blank, it is to be understood that the sections and guard may be formed of separate parts and connected together in any suitable or desirable manner.

Furthermore, while the device is especially adaptable for use in collecting turpentine from pine trees the same may be advantageously utilized to collect the sap or gum from the maple or for collecting gums from any of the gummiferous trees.

What I claim is:

1. A gutter fashioned with a pair of diverging sections having angularly disposed longitudinally extending sides equipped with inner faces and integrally fashioned together at one end to form a depending neck portion laterally bounded by said sides, said neck portion fashioned with a discharge port extending therethrough between said inner faces of said sides, said sections adapted to embrace the trunk of a tree subjacent a sap-emitting kerf to form an apron on said trunk of the area between said sections whereby to receive sap from said apron for discharge through said port.

2. A gutter fashioned with a pair of diverging sections having angularly disposed longitudinally extending sides equipped with inner faces and integrally fashioned together at one end to form a depending neck portion laterally bounded by said sides, said neck portion fashioned with a discharge port extending therethrough between said inner faces of said sides, said sections adapted to embrace the trunk of a tree subjacent a sap-emitting kerf to form an apron on said trunk of the area between said sections whereby to receive sap from said apron for discharge through said port, and a guard formed on said sides and neck portion subjacent said port whereby to prevent foreign matter from entering a receptacle secured to said trunk subjacent said port.

WILLIAM W. DENTON.